US005230811A

United States Patent [19]

Shimotomai et al.

[11] Patent Number: 5,230,811

[45] Date of Patent: Jul. 27, 1993

[54] CLEANER FOR THERMOSTATIC WATER BATH

[76] Inventors: Naomasa Shimotomai, 3-1-16-719, Nakaaoki, Kawaguchi-Shi, Saitama; Eriko Miyazawa, 4-14-6, Shinden, Ichikawa-Shi, Chiba; Takahiro Ueyama, 2110-8, Ino, Toride-Shi, Ibaragi, all of Japan

[21] Appl. No.: 866,107

[22] Filed: Apr. 7, 1992

Related U.S. Application Data

[63] Continuation of Ser. No. 364,479, Jun. 12, 1989, abandoned.

[51] Int. Cl.[5] .......................... C02F 1/76; C11D 3/48

[52] U.S. Cl. .................................. 210/755; 210/764; 252/106; 252/542; 252/548; 252/107; 514/241; 504/155

[58] Field of Search ...................... 252/106, 542, 548; 514/241; 210/764, 755

[56] References Cited

U.S. PATENT DOCUMENTS 3,981,998 9/1976 Waldstein ........................ 252/107

FOREIGN PATENT DOCUMENTS 48-58025 8/1973 Japan .

OTHER PUBLICATIONS

Jefferson Chemical Co. Technical Bulletin (1954) Ethanolomine.

*Primary Examiner*—Prince Willis, Jr.
*Assistant Examiner*—John F. McNally

[57] ABSTRACT

A novel cleaner is disclosed, which is added to a reaction thermostat with water as medium in a scientific apparatus, particularly a thermostatic water bath in an automatic analyzer, and has bacteria-proof, fungi-proof and algae-proof effects. The cleaner comprises a triazine derivative and a surface active agent. Furthermore, the cleaner preferably contains a compound represented by a formula [I]:

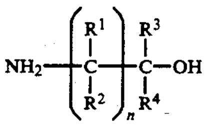

[I]

wherein $R^1$, $R^2$, $R^3$ and $R^4$ independently represent a hydrogen atom, a methyl group or a hydroxymethyl group, and n is an integer of 1 to 5.

3 Claims, 1 Drawing Sheet

CLEANER FOR THERMOSTATIC WATER BATH

This application is a continuation of application Ser. No. 364,479 filed Jun. 12, 1989 now abandoned.

BACKGROUND OF THE INVENTION

This invention relates to a novel cleaner having bacteria-proof, fungi-proof and algae-proof effects which is to be added to a reaction thermostat using water as medium in scientific apparatus, particularly a thermostatic water bath in an automatic analyzer.

Generally, in the field of the clinical chemistry, measurement of physiologically active substances in such organism samples as serum, urine or tissue fluid, e.g., enzymes, lipids, proteins, etc., is made widely for the purpose of diagnosis of diseases and grasping disease conditions.

Automatic analyzers have various features such as quick operation, high efficiency, high accuracy, convenient handling, small amounts of samples and reagent required for analysis and capability of saving energy, so that they are employed widely in the field noted above. The measurement is usually done in the order of taking a sample, adding a reagent, mixing, incubation, color comparison (measurement of absorbance) and calculation. The incubation is effected by an air bath system or a water or oil bath system, but most generally a water bath is used as thermostat. The reaction temperature is usually below 50° C. and most generally 37° C. The absorbance is measured by a system, in which measurement is done by sucking up reaction solution from a reaction vessel to a cell, or a system, in which the reaction vessel is measured directly as measurement cell. At present, the latter system is mainly adopted. In the measurement of this system, with a thermostatic water bath as thermostat, light from a light source disposed outside the water bath is passed through the water bath and through a reaction vessel therein to be detected by a sensor disposed on the opposite side of the water bath. In this way, the reaction vessel is also used as cell for measuring. The wavelength used for measurement is usually 340 to 900 nm.

Usually, water in the thermostatic water bath in the automatic analyzer is replaced once or several times a day. At the time of water replacement, air bubbles are frequently attached to the outer wall of the reaction vessel. To prevent this, a slight amount of cleaner is usually added. The cleaner used to this end is usually prepared from various surface active agents as the main component by adding a chelating agent, a pH controller, a preservative agent, etc. to the main component. It has poor bubble-formation property, and it is added to a concentration of 0.05 to 2.0 V/V % in the water bath. However, in the water bath using such water, the component of cleaner serves as source of nutrition to promote generation of algae and growth of various microorganisms (bacteria etc.). Any preservative agent added can not substantially provide any effect. As a consequence, a great error in the measurement of the absorbance was produced by a cause such as generation of algae on the reaction vessel and/or growth of various microorganisms in water in the water bath, etc. For this reason, as the analyzer requires sufficient daily maintenance control, in the use of the apparatus a great deal of labor is required for accuracy maintenance and maintenance control by frequently monitoring or periodically cleaning the inside of the water bath. Therefore, improvement in this respect is strongly desired.

SUMMARY OF THE INVENTION

An object of the invention is to provide a novel cleaner, which is added to a reaction thermostat using water as medium in a scientific apparatus, particularly a thermostatic water bath in an automatic analyzer, which can provide bacteria-proof, fungi-proof and algae-proof effects for long time.

It is another object of the present invention to provide a novel cleaner which produces no (or less) substances having absorption in the measurement wavelength range of 340 to 900 nm as a result of decomposition of its components.

According to one aspect of the present invention, there is provided a cleaner for a thermostatic water bath, which comprises a triazine derivative and a surface active agent.

According to another aspect of the present invention, there is provided a cleaner for a thermostatic water bath, which comprises a triazine derivative, a surface active agent and a compound represented by a formula [I]:

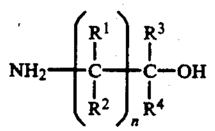

[I]

wherein $R^1$, $R^2$, $R^3$ and $R^4$ independently represent a hydrogen atom, a methyl group or a hydroxymethyl group, and n is an integer of 1 to 5.

The above and other objects, features and advantages of the invention will be appreciated upon a review of the following description of the invention when taken in conjunction with the attached drawings with understanding that some modifications, variations and changes may be easily accomplished by those skilled in the art to which the invention pertains without departing from the spirit of the invention or scope of the claims appended thereto.

DETAILED DESCRIPTION OF THE PREFERRED EMBODIMENTS OF THE INVENTION

Figure 1:
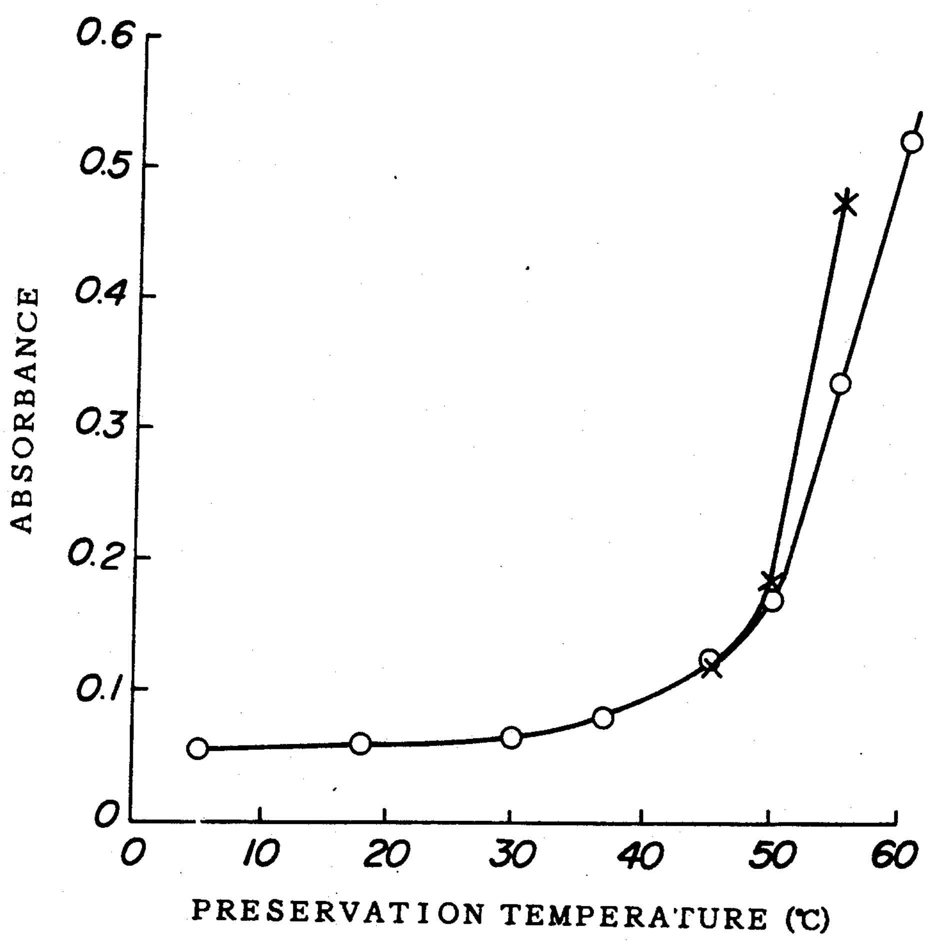
FIG. 1 shows the results of stability test on a cleaner for a thermostatic water bath, which is obtained in Example 3 and mainly composed of a triazine derivative and a surface active agent, at predetermined preservation temperatures, with the ordinate taken for the absorbance (340 nm) and the abscissa taken for the preservation temperature, circle marks showing results when left in a thermostatic water bath and cross marks showing results when left in a thermostat.

The inventors conducted extensive researches and investigations in order to solve the problems discussed above, and they thought that a cause for generation of algae and growth of microorganisms (bacteria etc.) is that the final concentration of the preservative agent present as a component of the cleaner in the thermostatic water bath is less than an effective concentration with ordinary concentration of the cleaner (which is 0.05 to 2.0 V/V %). Accordingly, they considered triazine derivatives, which are effective in small quantities, that is, low effective concentration preservative agents, and after extensive researches and investigations they found that by using a cleaner containing a triazine derivative and a surface active agent it is possible to prevent generation of algae and growth of microorganisms (bacteria etc.) in the thermostatic water bath. The present invention is predicated in this finding.

As the triazine derivative used as a low effective concentration preservative agent according to the invention, particularly 1,3,5-triazine derivative, and as the embodiment may be used cyanuric acid, cyanuric chloride, hexahydro-1,3,5-tris (6-hydroxyethyl) triazine, 2-chloro-4,6-dialkylamino-1,3,5-triazine, 2-methylthio-4,6-dialkyl-1,3,5-triazine, hexahydro-1,3,5-triethyltriazine, etc. These triazine derivatives may be used alone or in combination. The amount used may correspond to a concentration which is effective for preventing the generation of algae and growth of microorganisms (bacteria etc.) and has no adverse effects on the measurement. In case of 1,3,5-triazine derivatives, they may be added either alone or in combination such that the total concentration is 0.003 to 0.08 W/V %, preferably 0.005 to 0.05 W/V %, in water of the thermostatic water bath and 3 to 80 W/W %, preferably 5 to 50 W/W %, in the cleaner.

Various other preservative agents except triazine compounds, for example, phenols, cresols, chlorine compounds, salicylic acid compounds, benzoic acid compounds, sodium acide, etc., are effective for the prevention of the growth of microorganisms. However, when they are used as a component of a cleaner for a thermostatic water bath, they are liable to have adverse effects on the measurement wavelengths or cause damage to metals or plastics as the material of the thermostatic water bath. More specifically, the preservative agent used for the purpose according to the invention basically should hardly have absorption in the measurement wavelength range (340 to 900 nm) at the concentration in use, should be soluble to water and/or surface active agent, should be free from precipitation or clouding with other cleaner components, should not attack glass, plastics, metals, etc., should maintain stable quality for long time and should be capable of preventing the generation of algae and growth of microorganisms (bacteria etc.) at a low effective concentration.

According to the invention, any surface active agent may substantially be used so long as it has no adverse effects on the measurement and can prevent attachment of air bubbles to the reaction vessel. More stringently, any surface active agent may be used without any particular limitation so long as it does not contain any water-insoluble substance, has poor bubble-formation property, has a high clouding point so that it is transparent even at the reaction temperature (37° C.), does not react or precipitate with any triazine derivative as preservative agent according to the invention or other cleaner component has substantially no absorption in a wavelength range of 340 to 900 nm, has no adverse effects on glass, metals, plastics, etc., as the materials of the thermostatic water bath and the reaction vessel of the automatic analyzer and is stable in quality, free from hazardousness and is easy to handle. Particularly, a nonionic surface active agent is suitably used. Examples of the nonionic surface active agent are fatty acid glyceride, polyoxyethylene fatty acid ester, polyoxyethylenealkylether, polyoxyethylenealkylarylether, sorbitan fatty acid ester, sucrose fatty acid ester, polyoxyethylenesorbitane fatty acid ester, polyoxyethylenealkylamine, polyoxyethylene fatty acid amide, polyoxyethylenepolypropylene glycol ether, etc. The concentration of the surface active agent in the cleaner is not particularly limited, but it is suitably 1 to 20 W/W %, preferably 3 to 10 W/W %. The surface active agents noted above may be used alone or in combination.

However, it is found that although the cleaner having the composition according to this invention noted above permits prevention of the generation of algae and growth of microorganisms (bacteria etc.) for long time, when it is preserved at a high temperature, some of its components are decomposed with lapse of time, thus producing substances which have absorption in a wavelength range of 340 to 900 nm used for the measurement and are liable to cause great errors in the absorbance measurement. Meanwhile, it is shown in American Society of Lubrication Engineers, Presented at The 24-th ASLE Annual Meeting in Philadelphia, page 201, May 5–9, 1969 that many triazine derivatives are decomposed in water into amines, amides, aldehydes, lower fatty acids such as formic acid, aminoalcohols, etc., with the reaction promoted at high temperature or in a strongly acid zone. However, the accurate mechanism of decomposition is not known, and it is not clear whether a substance having absorption in the measurement wavelength range noted above is produced by the decomposition of a triazine derivative as noted above.

The inventors conducted extensive researches and investigations in order to solve the problems discussed above, and they found that the cleaner obtained by adding a compound represented by formula [I] to a cleaner composed of a triazine derivative as low effective concentration preservative agent and surface active agent, can prevent, not only the generation of algae and growth of microorganisms (bacteria etc.) in the thermostatic water bath, but also formation of a substance having absorption in the measurement wavelength range of 340 to 900 nm due to decomposition of a component of the cleaner when the cleaner is preserved at a high temperature.

According to another subject of the present invention, there is provided a cleaner for a thermostatic water bath, which comprises a triazine derivative, a surface active agent and a compound represented by a formula [I]:

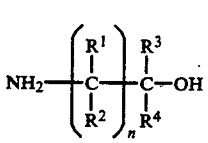

[I]

wherein $R^1$, $R^2$, $R^3$ and $R^4$ independently represent a hydrogen atom, a methyl group or a hydroxymethyl group, and n is an integer of 1 to 5.

In formula [I] representing a compound used according to the present invention, $R^1$, $R^2$, $R^3$ and $R^4$ may independently represent a hydrogen atom, a methyl group or a hydroxymethyl group, and n may be an integer of 1 to 5. The usage of the compound represented by formula [I] varies slightly with the kind of compound. Usually, the compound is added to the cleaner in an amount of about 0.3 mol or above, preferably 0.5 mol or above, more preferably 1 mol or above, to 1 mol of triazine derivative. The compounds may be used alone or in combination.

However, increasing the concentration of the compound in the cleaner according to the present invention will lead to an excessive viscosity of the solution of the cleaner or clouding of the solution, so that this is undesired for the cleaner according to the present invention. The cleaner according to the present invention is mainly added to a thermostatic water bath of an automatic analyzer, and usually it is added to the thermostatic water bath via a small-diameter plastic tube. Therefore, if the solution of the cleaner has an excessive viscosity or is clouded, it is liable that a predetermined amount of cleaner can not be added to the thermostatic water bath or the plastic tube for transfer is clogged. For the above reasons, the cleaner solution desirably has a viscosity of 6 cst or below and is transparent.

Further, it is possible, so long as the purpose of the present invention is not spoiled, to add to the cleaner according to the present invention, various surface active agents, chelating agents, pH controllers, preservative agents and stabilizers, e.g., β-thiodiglycol.

Now, the present invention will be described in detail in connection with examples without any sense of restriction.

EXAMPLE 1

Measurement of Minimum Inhibitory Concentration of Triazine Compound for Microorganism

Test microorganism

The following microorganisms (fungi, bacteria, yeast and algae) grown in a thermostatic water bath of an automatic analyzer and mold prescribed in a mold resistance test method disclosed in JIS-Z-2911 were used.

Bacteria: *Pseudomonas aeruginosa, Bacillus subtilis, Escherichia coli*

Fungi: *Aspergillus niger, Fusarium moniliforme, Cladosporium cladosporioides, Penicillium citrinum*

Algae: Green algae, Bacillariophyta, Cyanophyta

Yeasts: *Saccharomyces cerevisiae, Rhodotorula sp.* culture solution

The following culture solutions were used in dependence on different kinds of microorganism.

| | |
|---|---|
| Bacteria: | |
| Beef extract | 3 g |
| Polypeptone | 10 g |
| Sodium chloride | 5 g |
| Distilled water | Total of 1,000 ml |
| Fungi: (Potato•dextrose•broth) | |
| Potato extract powder | 4 g |
| Dextrose | 20 g |
| Distilled water | Total of 1,000 ml |
| Algae: (Dead•melt•broth) | |
| $Ca(NO_3)_2 \cdot 4H_2O$ | 1 g |
| $MgSO_4 \cdot 7H_2O$ | 0.25 g |
| KCl | 0.25 g |
| $KH_2PO_4$ | 0.25 g |
| $FeCl_3$ | Trace |
| Distilled water | Total of 1,000 ml |
| Yeasts (Malt•yeast•broth) | |
| Yeast extract | 3 g |
| Glucose | 10 g |
| Malt extract | 3 g |
| Peptone | 5 g |
| Distilled water | Total of 1,000 ml |

Procedure

The individual bacteria were cultured in the respective culture solution until more than predetermined bacteria numbers (i.e., more than $10^7$ bacteria per ml in case of bacteria and Yeasts, more than $10^8$ bacteria per ml in case of algae and more than $10^6$ bacteria per ml in case of mold) were obtained. Then, hexahydro-1,3,5-tris (β-hydroxyethyl) the triazine, represented as

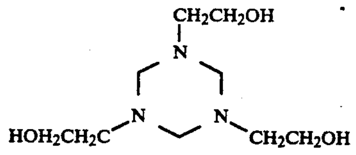

(hereinafter abbreviated as THT) as triazine compound according to the present invention was added to the individual culture solution, and the minimum inhibitory concentration (i.e., minimum amount necessary for growth prevention) was determined at 30° C. and after 48 hours in case of bacteria and Yeasts, at 28° C. and after 120 hours in case of mold and at 35° C. and after 168 hours in case of algae.

The determination was made by using contrast by the same operation except for that THT was not added.

Results

Table 1 shows the minimum inhibitory concentrations of THT for the individual microorganisms.

TABLE 1

| Microorganism | Minimum inhibitory concentration |
|---|---|
| *Pseudomonas aeruginosa* | 100 (ppm) |
| *Bacillus subtilis* | 50 |
| *Escherichia coli* | 50 |
| *Aspergillus niger* | 100 |
| *Fusarium moniliforme* | 10C |
| *Cladosporium cladosporioides* | 100 |
| *Penicillium citrinum* | 100 |
| Green algae | 100 |
| Cyanophyta | 100 |
| Bacillariophyta | 100 |
| *Saccharomyces cerevisiae* | 50 |
| Rhodotorula sp. | 50 |

EXAMPLE 2

Measurement of Minimum Inhibitory Concentration of Cleaner for Thermostatic Water Bath Mainly Composed of Triazine Derivative and Surface Active Agent with Respect to Microorganisms

Cleaner for thermostatic water bath

A cleaner for a thermostatic water bath was prepared by mixing THT, polyoxyethylenenonylphenylether and distilled water in proportions of 10:2:88.

The minimum inhibitory concentration of the cleaner for microorganism was measured in the manner as in Example 1 using the same microorganisms and culture medium except for that the above-mentioned cleaner was used in lieu of THT in Example 1, and the minimum inhibitory concentration of the cleaner with respect to microorganism was measured in the same manner as in Example 1.

Results

Results are shown in Table 2.

TABLE 2

| Microorganism | Minimum inhibitory concentration of the cleaner | THT concentration in a culture solution |
|---|---|---|
| *Pseudomonas aeruginosa* | 500 (ppm) | 50 (ppm) |
| *Bacillus subtilis* | 400 | 40 |
| *Escherichia coli* | 500 | 50 |
| *Aspergillus niger* | 600 | 60 |
| *Fusarium moniliforme* | 500 | 50 |
| *Cladosporium cladosporioides* | 400 | 40 |
| *Penicillium citrinum* | 600 | 60 |
| Green algae | 800 | 80 |
| Cyanophyta | 700 | 70 |
| Bacillariophyta | 800 | 80 |
| *Saccharomyces cerevisiae* | 500 | 50 |
| Rhodotorula sp. | 500 | 50 |

It will be seen from the results shown in Tables 1 and 2, the triazine compound according to the present invention is effective at low concentration for microorganisms either alone or as the cleaner mainly composed of triazine derivative and surface active agent. Further, it is found that in case of the use of the triazine compound in combination with a surface active agent, minimum inhibitory concentration of the triazine compound for microorganisms is lower than that in case of the use of the triazine compound only.

EXAMPLE 3

Study of Stability of Cleaner for Thermostatic Water Bath Mainly Composed of Triazine Derivative and Surface Active Agent in Storage

Cleaner for Thermostatic Water Bath

A cleaner for a thermostatic water bath was prepared by mixing THT, polyoxyethylenenonylpheynylether and distilled water in weight proportions of 20:5:75.

Procedure

The cleaner noted above is left in a thermostatic water bath or thermostat at a predetermined temperature for 48 hours, and the absorbance of 340 nm of the cleaner was measured.

Results

FIG. 1 shows the results of measurement. In FIG. 1, circle marks represent the results when the thermostatic water bath was used, and cross marks represent the results when the thermostat was used. It is found from the FIG. 1 that the above-mentioned cleaner has problems in stability when preserved at high temperature.

EXAMPLE 4

Study of Stabilizer

It is found from the results of Example 3 that the cleaner mainly composed of triazine derivative and surface active agent has problems in stability when preserved at high temperature. Accordingly, the stabilizer at the time of storage at high temperature was studied.

Cleaner for Thermostatic Water Bath

A cleaner for a thermostatic water bath was prepared by mixing THT, polyoxyethylenenonylphenylether, a predetermined compound and distilled water in weight proportions of 20:5:5:70.

Procedure

The above-mentioned cleaner was left in a thermostat at 50° C. for a predetermined number of days, and then absorbance of 340 nm of the cleaner was measured.

Results

Results of measurement are shown in Tables 3-1 and 3-2

TABLE 3-1

| Predetermined compound | Absorbance (340 nm) The day | 7-th day | 30-th day |
|---|---|---|---|
| None | 0.067 | 0.388 | 1.282 |
| Monoethanolamine | 0.067 | 0.154 | 0.298 |
| Diethanolamine | 0.065 | 0.725 | 2↑ |
| Triethanolamine | 0.065 | 0.917 | 2↑ |
| 2-amino-2-methyl-1-propanol | 0.065 | 0.249 | 0.683 |

TABLE 3-2

| Predetermined compound | Absorbance (340 nm) The day | 7-th day | 30-th day |
|---|---|---|---|
| 2-(ethylamino) ethanol | 0.065 | 1.271 | 2↑ |
| Formamide | 0.068 | 2↑ | — |
| N,N-dimethylformamide | 0.062 | 2↑ | — |
| Glycin | 0.105 | 2↑ | — |
| L-alanine | 0.088 | 2↑ | — |
| L-glutamine | 0.078 | 2↑ | — |
| p-aminobenzoic acid | 2↑ | — | — |
| γ-amino-n-lactic acid | 0.120 | 2↑ | — |
| Tris (hydroxymethyl) aminomethane | 0.073 | 0.188 | 0.470 |
| 2-diethylaminoethanol | 0.044 | 0.377 | 2↑ |
| 2-(methylamino) ethanol | 0.054 | 1.888 | 2↑ |
| N-methyldiethanolamine | 0.052 | 0.509 | 2↑ |
| 2-dimethylaminoethanol | 0.052 | 0.364 | 2↑ |
| (s)-(+)-2-amino-1-buthanol | 0.470 | 2↑. | — |
| 2-amino-2-methyl-1,3-propanediol | 0.064 | 0.287 | 0.897 |
| Acetoamide | 0.065 | 0.538 | 2↑ |
| 3-amino-1-propanol | 0.058 | 0.120 | 0.234 |
| (+)-3-amino-1,2-propanediol | 0.066 | 0.115 | 0.205 |
| (1s,2s)-(+)-2-amino-1-phenyl-1,3-propanediol | 0.183 | 0.390 | 1.305 |
| 5-amino-1-pentanol | 0.053 | 0.158 | 0.312 |
| L-2-amino-3-methyl-1-butanol | 0.063 | 0.340 | 1.098 |
| 6-amino-1-hexanol | 0.256 | 0.418 | 0.754 |

From the results of Tables 3-1 and 3-2 it is seen that compounds represented by formula I, e.g., monoethanolamine, 2-amino-2-methyl-1-propanol, tris (hydroxymethyl) aminomethane, 2-amino-2-methyl-1,3-propanediol, 3-amino-1-propanol, (+)-3-amino-1,2-propanediol, and 5-amino-1-penthanol, 6-amino-1-hexanol, are effective stabilizers at the time of storage at high temperature.

EXAMPLE 5

Study on Necessary Concentration of Stabilizer

A study was done on necessary mols of the stabilizers at the time of storage at high temperature per one mol of triazine derivative in the cleaner for a thermostatic water bath is found in Example 4.

Cleaner for Thermostatic Water Bath

A cleaner for a thermostatic water bath was prepared by adding distilled water to 20 parts by weight of THT, 5 parts by weight of polyoxyethylenenonylphenylether and a predetermined part by weight of the stabilizer at the time of storage at high temperature such that the mixture as a whole is 100 parts by weight.

Procedure

The above mentioned cleaner was left in a thermostat at 50° C. for a predetermined number of days, and then absorbance of 340 nm of the cleaner was measured.

Results

Results of measurement are shown in Tables 4-1 and 4-2. In the table, the molar ratio represents the quotient of division of the mol number of the stabilizer at the time of storage at high temperature contained in the cleaner by the mol number of THT.

TABLE 4-1

| Stabilizer | Molar ratio | Absorbance (340 nm) The day | 7-th day | 30-th day |
|---|---|---|---|---|
| Monoethanolamine | 0.18 | 0.046 | 0.283 | 0.762 |
| | 0.35 | 0.051 | 0.213 | 0.465 |
| | 0.53 | 0.045 | 0.216 | 0.450 |
| | 1.0 | 0.068 | 0.186 | 0.287 |
| | 1.5 | 0.066 | 0.151 | 0.249 |
| | 2.0 | 0.068 | 0.127 | 0.234 |
| 2-amino-2-methyl-1-propanol | 0.56 | 0.058 | 0.300 | 0.668 |
| | 1.0 | 0.054 | 0.252 | 0.482 |
| | 1.5 | 0.052 | 0.249 | 0.477 |
| | 2.0 | 0.048 | 0.215 | 0.453 |

TABLE 4-2

| Stabilizer | Molar ratio | Absorbance (340 nm) The day | 7-th day | 30-th day |
|---|---|---|---|---|
| Tris(hydroxymethyl) aminomethane | 0.41 | 0.067 | 0.212 | 0.488 |
| | 1.0 | 0.066 | 0.206 | 0.397 |
| | 1.5 | 0.066 | 0.170 | 0.265 |
| | 2.0 | 0.060 | 0.148 | 0.246 |
| 3-amino-1-propanol | 0.37 | 0.064 | 0.203 | 0.438 |
| | 1.0 | 0.060 | 0.129 | 0.231 |
| | 1.5 | 0.059 | 0.098 | 0.182 |
| | 2.0 | 0.058 | 0.077 | 0.127 |
| 5-amino-1-pentanol | 0.5 | 0.057 | 0.180 | 0.438 |
| | 1.0 | 0.056 | 0.125 | 0.274 |
| | 1.5 | 0.057 | 0.099 | 0.193 |

From the results shown in Tables 4-1 and 4-2, it is thought that the necessary concentration of the stabilizer at the time of storage at high temperature in the cleaner, is more than 0.3 to 0.5 mol per mol of triazine derivative although it varies slightly depending on the kind of the stabilizer used.

EXAMPLE 6

Measurement of Minimum Inhibitory Concentration for Microorganisms of Cleaner for thermostatic Water Bath according to the Invention

Cleaner for Thermostatic Water Bath

A cleaner for a thermostatic water bath was prepared by mixing THT, polyoxyethylenenonylphenylether, monoethanolamine and distilled water in weight proportions of 20:5:5:70.

Procedure

The above-mentioned cleaner was left in a thermostat at 50° C. for 90 days. Then, the minimum inhibitory concentration of the cleaner for microorganism was measured in the same manner as in Example 1 using the same microorganism and culture medium as in Example 1 except for that the cleaner was used in lieu of THT in Example 1.

Results

Results are shown in Table 5.

TABLE 5

| Microorganism | Minimum inhibitory concentration of the cleaner | THT concentration in a culture solution |
|---|---|---|
| *Pseudomonas aeruginosa* | 250 (ppm) | 50 (ppm) |
| *Bacillus subtilis* | 200 | 40 |
| *Escherichia coli* | 250 | 50 |
| *Aspergillus niger* | 300 | 60 |
| *Fusarium moniliforme* | 250 | 50 |
| *Cladosporium cladosporioides* | 200 | 40 |
| *Penicillium citrinum* | 300 | 60 |
| Green algae | 400 | 80 |
| Cyanophyta | 300 | 60 |
| Bacillariphyta | 400 | 80 |
| *Saccharomyces cerevisiae* | 250 | 50 |
| Rhodotorula sp. | 250 | 50 |

It will be seen from the results of FIG. 5 that the cleaner according to the present invention is effective at low concentration for microorganism.

EXAMPLE 7

Cleaner for Thermostatic Water Bath

A cleaner for a thermostatic water bath is prepared by mixing THT, polyoxyethylenenonylphenylether, monoethanolamine and distilled water in weight proportions of 20:5:5:70.

Procedure

The above-mentioned cleaner was diluted to 1,000 times with distilled water, and the diluted cleaner was stored in a polyethylene container at 28° C.

As contrast, a cleaner was prepared without adding THT, and it was stored under the same condition.

After the storage, the generation of algae and growth of microorganisms (bacteria etc.) in the cleaners with and without THT were visually examined daily.

Further, using Automatic Analyzer (Hitachi Model 736), the cleaner was added to the thermostatic water bath such that it was diluted to 1,000 times, and effects on the measured value were measured.

As contrast, a cleaner was prepared without addition of THT, and added to the thermostatic water bath of Automatic Analyzer (Hitachi Model 736).

To determine effects on the measurement, daily variations of the within-run precision of Transaminase (GOT, GPT) by UV rate method as a check item, with which most outstanding effects of contamination of water in the thermostatic water bath and air bubbles attached to the reaction vessel could be detected, were done. (n=40, Reagent: Transaminase HR II (manufactured by Wako Pure Chemical Industries, Ltd.), Standard serum: Control Serum I (manufactured by Wako Pure Chemical Industries, Ltd.).

Results

In case of use of the cleaner free from THT, growth of microorganisms (bacteria etc.) was recognized in the 7-th day, and also in the results of test using the automatic analyzer influence was recognized in the measured value. In case of use of the cleaner with THT, however, neither generation of algae nor growth of microorganisms (bacteria etc.) could recognized even in the 60-th day.

Table 6 shows results of measurement of daily variations of the number of alive microorganisms per ml in water in the thermostatic water bath in case of use of cleaners with or without THT, and Table 7 shows results of pursuit of daily variations of the within-run precision of GOT and GPT by using an automatic analyzer with cleaner with THT.

TABLE 6

| Days passed | Number of alive microorganisms (per ml) with THF | without THT |
|---|---|---|
| The day | $6 \times 10^5$ | $6 \times 10^5$ |
| 7-th day | $4 \times 10^4$ | $9 \times 10^6$ |
| 10-th day | $3 \times 10^2$ | $6 \times 10^7$ |
| 14-th day | $2 \times 10^2$ | $8 \times 10^8$ |
| 21-th day | $1 \times 10^1$ | $7 \times 10^8$ |
| 28-th day | $1 \times 10^1$ | $1 \times 10^9$ ↑ |
| 60-th day | $1 \times 10^1$ | $1 \times 10^9$ ↑ |

TABLE 7

| Item | GOT(mU/ml) | | GPT(mU/ml) | |
|---|---|---|---|---|
| Days passed | m | S D | m | S D |
| The day | 22.4 | 0.44 | 26.2 | 0.43 |
| 7-th day | 21.5 | 0.48 | 26.8 | 0.44 |
| 14-th day | 22.1 | 0.45 | 26.3 | 0.45 |
| 21-th day | 22.4 | 0.53 | 27.0 | 0.35 |
| 28-th day | 23.0 | 0.49 | 26.8 | 0.49 |
| 35-th day | 22.8 | 0.52 | 26.5 | 0.48 |

m: mean value, S D: standard deviation

As is obvious from the results shown in Tables 6 and 7, when a cleaner according to the present invention is added, neither generation of algae nor growth of microorganisms (bacteria etc.) were recognized even in the results of test using the automatic analyzer. Further, no influence on the measurement could be recognized.

Similar results could be obtained in case of using cyanuric acid as the triazine compound in lieu of THT.

As has been described in the foregoing, there is provided a cleaner for a thermostatic water bath, which can be used for a scientific apparatus, particularly an automatic analyzer, having a thermostatic water bath with water as medium to prevent generation and growth of microorganisms (bacteria etc.) in water in the water bath and accompanying deterioration of the measurement accuracy and also to prevent generation and attachment of air bubbles on the outer wall of a reaction vessel in the water bath. Furthermore, by adding to the cleaner a compound represented by formula [I], there is provided a cleaner for a thermostatic water bath which produces no (or less) substance having absorption in the measurement wavelength range of 340 to 900 nm due to decomposition of some of its components at the time of storage. Thus, by using the cleaner according to the present invention, it is possible to obtain pronounced effects in the ability of making use of the quickness, high efficiency, high accuracy and convenience of operation as merits of the automatic analyzer to a greater extent than in the prior art.

What is claimed is:

1. A process for preventing generation of algae and growth of microorganisms in a thermostatic water bath in an automatic analyzer, which comprises adding an effective amount of a cleaner to water in the thermostatic water bath, the cleaner comprising a 1,3,5-triazine derivative selected from the group consisting of cyanuric acid; cyanuric chloride; hexahydro-1,3,5-tris (β-hydroxyethyl) triazine; 2-chloro-4,6-dialkyl-amino-1,3,5-triazine; 2-methylthio-4,6-dialkyl-1,3,5-triazine; and hexahydro-1,3,5-triethyltraizine, a nonionic surface active agent selected from the group consisting of fatty acid glyceride, polyoxethylene fatty acid ester, polyoxyethylenealkylether, polyoxyethylenealkylarylether, sorbitan fatty acid ester, sucrose fatty acid ester, polyoxyethylenesorbitan fatty acid ester, polyoxyethylenealkylamine, polyoxyethylene fatty acid amide and polyoxyethylenepolypropyleneglycolether, and at least 0.3 mol of a compound represented by formula [I]:

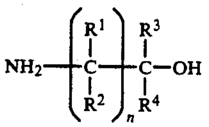

wherein $R^1$, $R^2$, $R^3$ and $R^4$ independently represent a hydrogen atom, a methyl group or a hydroxymethyl group, and n is an integer of 1 to 5, to 1 mol of the triazine derivative.

2. A process according to claim 1, wherein the concentration of said 1,3,5-triazine derivative is 0.003 to 0.08 W/V% in the water of the thermostatic water bath.

3. A process according to claim 1, wherein said compound represented by formula [1] is monoethanolamine. a

* * * * *